United States Patent

Kukasawa et al.

[11] 3,889,312
[45] June 17, 1975

[54] HEADLAMP WIPER ASSEMBLY

[75] Inventors: Noburu Fukasawa, Kamakura; Kyoji Kobayashi, Chigasaki, both of Japan

[73] Assignee: Nissan Motor Company Limited, Yokohama, Japan

[22] Filed: June 27, 1973

[21] Appl. No.: 374,124

[52] U.S. Cl. ........ 15/250.34; 15/250 A; 15/250.25; 15/250.27
[51] Int. Cl. ............................................ B60s 1/34
[58] Field of Search ........ 15/250 A, 250.22, 250.25, 15/250.3, 250.31, 250.34, 250.27, 250.35; 403/150–153, 111, 120, 149

[56] References Cited
UNITED STATES PATENTS

| 3,641,613 | 2/1972 | Povilaitis et al. ................. 15/250 A |
| 3,671,994 | 6/1972 | Breitschwerdt et al. ........ 15/250.3 X |
| 3,825,971 | 7/1974 | Ursel et al. ....................... 15/250.27 |

FOREIGN PATENTS OR APPLICATIONS

| 1,091,888 | 10/1960 | Germany ......................... 15/250.34 |
| 481,141 | 5/1953 | Italy ................................ 15/250.27 |

*Primary Examiner*—Peter Feldman

[57] ABSTRACT

A motor oscillably driving a spindle through a flexible cable, the spindle being pivotally and drivably connected to a wiper arm and blade assembly by a detachable hinge connection.

1 Claim, 7 Drawing Figures

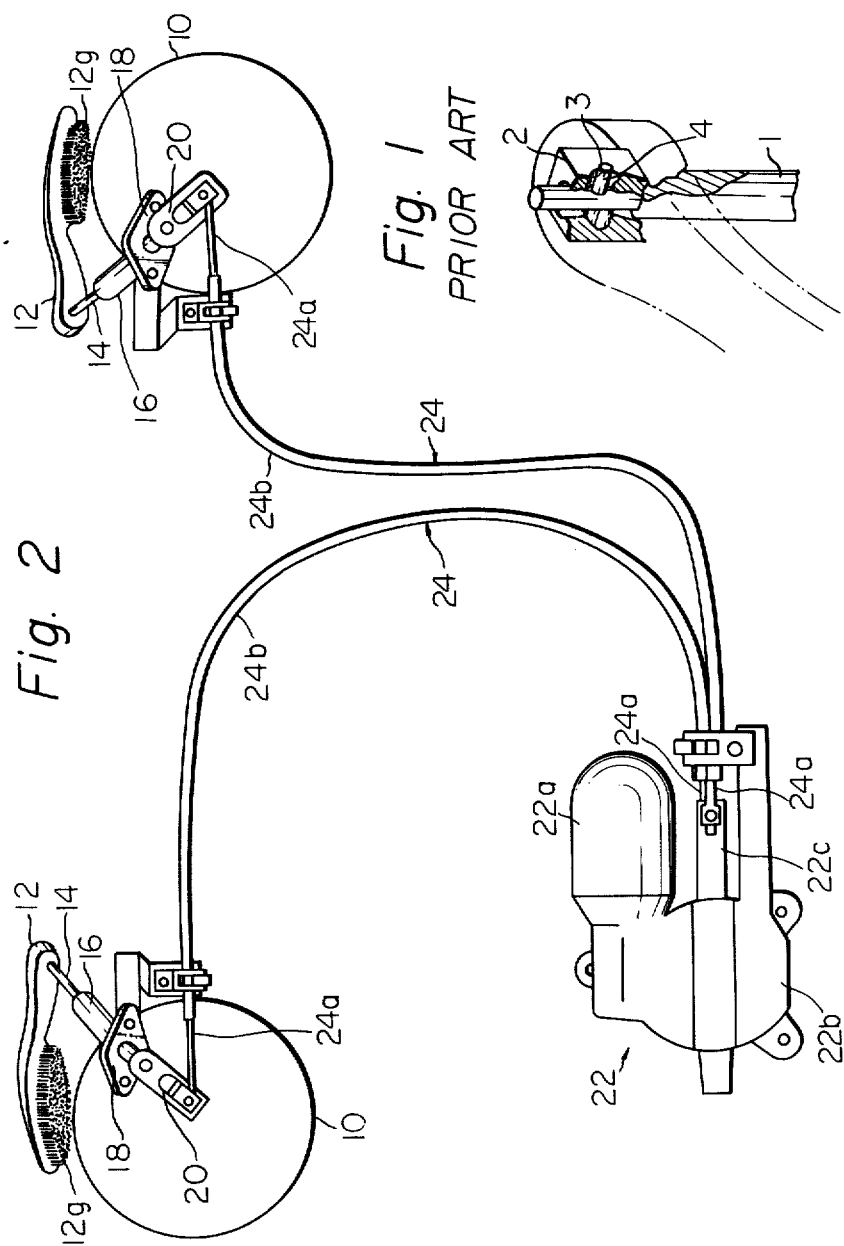

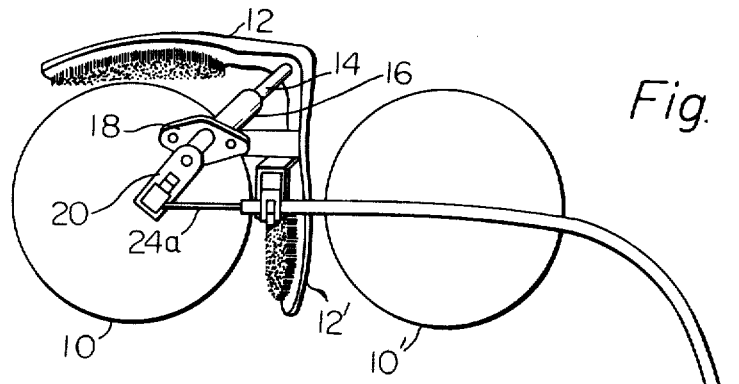
Fig. 5
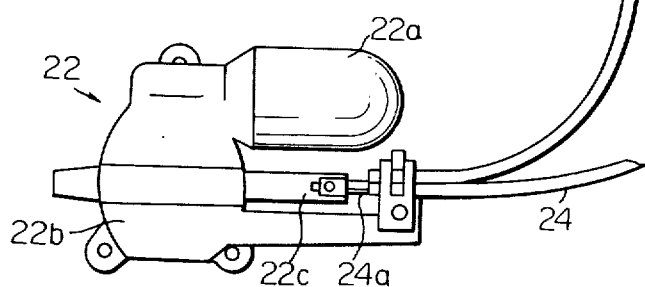
Fig. 6
Fig. 7
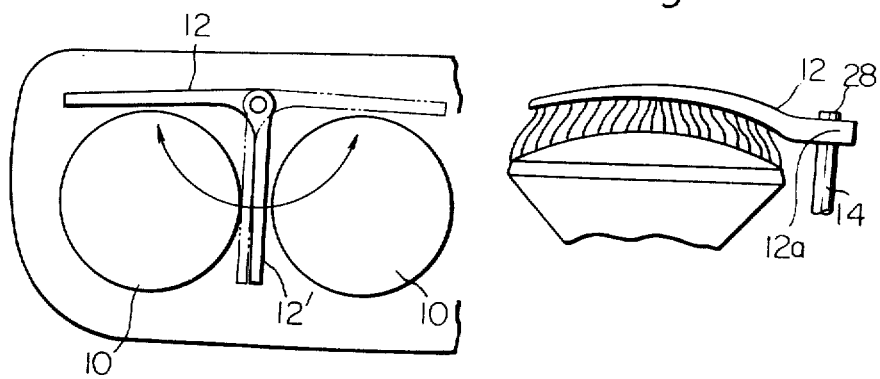

HEADLAMP WIPER ASSEMBLY

The present invention relates to a headlamp wiper assembly, and more particularly to a headlamp wiper assembly for a vehicle.

Heretofore many improvements have been proposed in the art, none of which have proven satisfactory. One reason appears to be that a conventional linkage mechanism cannot be readily accommodated within a small space adjacent to a headlamp to be wiped, due to the large space required for movement of the links. Moreover, a wiper of a type which includes a small wiper motor and a single blade directly driven by the wiper motor cannot be compactly fitted on a front panel of a vehicle adjacent to a headlamp to be wiped.

Another reason appears to be that a conventional spring hinge assembly or hinge connection between a driving spindle and a wiper arm is too bulky for a headlamp wiper, and no feasible connection has yet been devised. A typical hinge connection for a headlamp wiper assembly is designed such that a reduced diameter section of a spindle fits loosely into a block which is integral with a wiper arm, and a transverse hinge pin connects the block and spindle such that the wiper arm is pivotable about the hinge pin and rotatable with the spindle. The wiper blade is pressed against the headlamp by a plate spring suitably attached to the spindle. It will be noted that fabrication of this hinge connection requires drilling a hole laterally through the block and spindle, and difficulties inherent in such close tolerance work will be readily understood. It has also been found that a considerable increase in the number of inferior parts results from failure in accurately drilling the holes. If the hinge pin becomes loose due to a clearance between the hinge pin and the hole caused by operating wear, both the spindle and the block must be replaced, and the increased maintenance cost can be readily understood.

Still another reason appears to be that where all headlamps of a four headlamp system are to be wiped, a rather complicated mechanism for producing simultaneous actuation of respective wiper arms for the headlamps is necessary.

In view of the above mentioned general shortcomings inherent in conventional headlamp wiper assemblies, it is an object of the present invention to provide a headlamp wiper assembly which can be readily accommodated within a limited space available adjacent to headlamps.

It is another object of the present invention to provide a hinge connection for a headlamp wiper arm and spindle which is easy to assemble and disassemble, wherein and it is unnecessary to replace all parts if one part becomes defective.

It is still another object of the present invention to provide a headlamp wiper assembly suitable for a vehicle having four headlamps.

One feature of the present invention is that a flexible drive means is used for operative connection between a wiper motor and oscillating spindle crank arms of respective spindles carrying wiper arms.

Another feature of the present invention is that a block, integral with a wiper arm, is provided with a bore having two grooves formed in opposite inner walls therein, and a spindle with a reduced diameter section which fits into a hinge plate, the hinge plate having two projections which pivotally engage in the grooves when the spindle and hinge plate are inserted into the bore, the block being kept from detaching from the spindle by a suitable fixer. The hinge plate is shaped and sized so that it rotatably connects the spindle and block, but can permit pivotal movement between the spindle and the block and consequently the wiper arm.

Still another feature of the present invention is that a wiper arm carries two blades or brushes which are angularly spaced from each other by a right angle about a spindle disposed between two adjacent headlamps of a four headlamp system. By this configuration of a wiper arm, two adjacent headlamps can be simultaneously wiped as the spindle rotatably oscillates within an angular range of 90°.

Other objects, features and advantages of the present invention will become more clear from the following description and the accompanying drawings, in which:

FIG. 1 is a fragmentary view partly in section of a prior art headlamp wiper hinge connection;

FIG. 2 is a diagrammatic view of one preferred embodiment of the present invention;

FIG. 5 is a diagrammatic view of another embodiment of the present invention;

FIG. 6 is a fragmentary view of part of a four headlamp system of a vehicle with a headlamp wiper assembly as shown in FIG. 5 disposed between two adjacent headlamps; and FIG. 7 is an enlarged fragmentary view of a wiper arm and a brush operatively contacting a lens of a headlamp which is usuable with the wiper assembly shown in FIGS. 2 to 4, or FIGS. 5 and 6.

Figure 3:
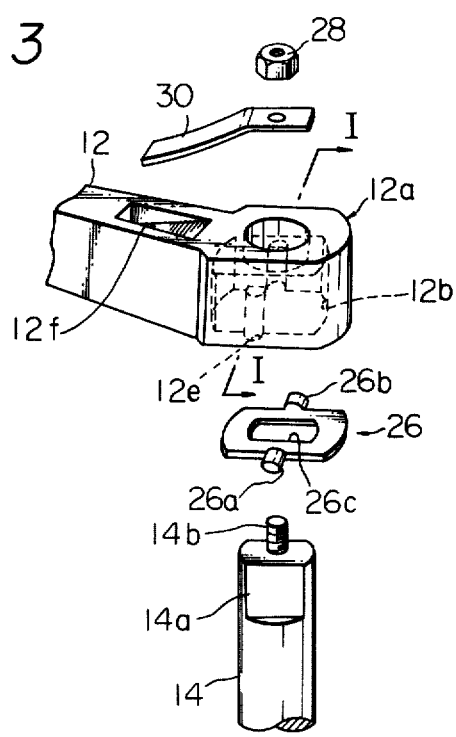
FIG. 3 is an exploded view of a part of the embodiment shown in FIG. 2.

In FIG. 1, there is shown a typical example of a prior art headlamp wiper arm hinge connection for a spindle 1 and a block 2 which is integral with a wiper arm (no numeral). As illustrated, the spindle 1 is disposed within a bore (no numeral) formed in the block 2 which is usually made by casting. The block 2 is movable about the spindle 1 because the diameter of the bore is larger than that of the spindle 1. A cross pin or hinge pin 4 is used to connect the block 2 to the spindle 1 and to permit the block 2 to pivot about the spindle 1 within limits determined by the clearance between the spindle 1 and the bore. It is necessary to drill a hole 3 laterally through the block 2 and the spindle 1 to receive the hinge pin 4. Drilling the hole 3 requires accurate positioning of the spindle 1 within the block 2 while drilling, requiring skilled labor and excessive fabrication time. It will thus be noted that this prior art design seriously limits economical mass production of the connection.

The features of the present invention will now be described with reference to an embodiment shown in FIGS. 2 to 4.

In FIG. 2 there is shown a headlamp wiper assembly for a two headlamp system of a vehicle (not shown). A reference numeral 10 designates headlamps disposed on a front panel (not shown) of the vehicle. Wiper arms 12 are mounted on or connected to spindles 14 respectively in a manner to be fully described later with reference to FIGS. 3 and 4, the wiper arms carrying blades or brushes 12g as shown. The spindles 14 are supported by bearing collars 16 fixed to the front panel by mountings 18 in a conventional manner. Secured to the spindles 14 are oscillating spindle crank arms 20. The oscillating crank arms 20 are rockably actuated from a wiper motor 22 comprising an electric motor 22a, a crank mechanism 22b, and a connecting rod 22c. The wiper motor thus provides a reciprocating drive. Operative interconnection between the connecting rod 22c and respective oscillating spindle crank arms 20 is achieved by a pair of flexible drive means 24. Each flexible drive means comprises a flexible drive cable 24a operatively connecting the connecting rod 22c with the respective oscillating crank arm 20, and a protective tube 24b covering the flexible drive cable 24a.

In FIG. 3 there are shown parts of a headlamp wiper arm hinge connection necessary for connecting the wiper arm 12 to the spindle 14. Integral with the wiper arm 12 is a block 12a having formed therein a cavity 12b extending vertically therethrough (as viewed in FIG. 3), the cavity 12b being reduced in diameter near a top portion of the block 12a and thus forming therein a shoulder 12c. Formed also in the inner wall of the cavity 12b are grooves 12d and 12e, which extend vertically (as viewed in FIG. 3) and are spaced opposite to each other about the vertical axis of the cavity 12b. The grooves 12d and 12e extend from the bottom face of the block 12a to portions adjacent to but spaced downward from the shoulders 12c at a distance represented as a in FIG. 4.

Insertable within the cavity 12b is a hinge plate 26 having projections 26a and 26b extending in opposite and outward directions therefrom. The hinge plate 26 is designed and sized so that the horizontal profile (as shown) thereof is substantially the same as that of the unreduced diameter portion of the cavity 12b, and the height of the former is less that of the latter. The projections 26a and 26b are designed and sized so that they are insertable within the grooves 12d and 12e respectively when the plate 26 is inserted into the cavity 12b, and they can pivot within the respective grooves in order to permit the plate 26 to pivot within the cavity 12b. Preferably the projections 12a and 12b are round in cross section as shown in FIG. 3 to ensure smooth relative pivotal movement between the projections and the respective grooves. Formed also in the hinge plate 26 is a slot 26c which is shaped and sized so that a reduced section 14a of the spindle 14 can fit therein.

Formed on the top of the reduced section 14a of the spindle 14 is a screw-threaded portion 14b which with a nut 28 fixably connects a plate spring 30 to the spindle 14. The plate spring 30 is sized to bridge over the opening in the top of the block, at which the reduced diameter portion of the cavity 12b terminates in. A reference numeral 12f designates a recess formed in the wiper arm 12 within which one end portion of the plate spring 30 engages.

The hinge plate 26 fits onto the reduced section 14a of the spindle 14. When the hinge plate 26 is fitted onto the spindle 14, the spindle 14 is inserted into the cavity 12b after aligning the projections 26a and 26b with the respective grooves 12e and 12d. The spindle 14 is pushed into the cavity 12b until the screw-threaded portion 14b protrudes from the top face of the block 12a. The plate spring 30 is then placed onto the screw-threaded portion 14b, and the nut 28 is tightened onto the screw-threaded portion 14b to hingably connect the block 12a to the spindle 14. The nut 28 should be tightened until the projections 26a and 26b abut against the terminating ends of the respective grooves 12e and 12d. Since the plate spring is sized to bridge over the opening in the top of the block 12a, the spindle 14 can not be removed from the cavity 12b. It will also be noted that the plate spring 30 urges the wiper arm 12 to effect a blade bias force.

As can now be seen, assembly of the parts for connecting the wiper arm 12 to the spindle 14 is quite easy and does not require drilling of holes for a hinge pin.

If disassembly is necessary as for replacing the hinge plate 26, all that is required is to remove the nut 28 in order to release all of the component parts. Thus, it will be appreciated that disassembly is quite easy.

Figure 4:
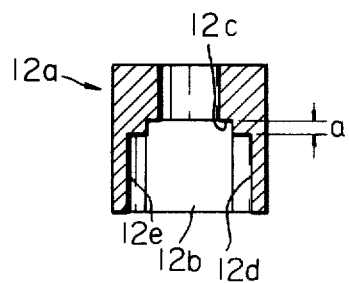
FIG. 4 is a sectional view of a component shown in FIG. 3 taken on a line I—I.

Since the hinge plate 26 is permitted to move pivotally, about an axis traverse to the longitudinal axis of the spindle 14, within a clearance represented by the distance a in FIG. 4, the wiper arm 12 is pivotable relative to the spindle 14, as will be readily appreciated. The wiper arm 12 is also movable about the longitudinal axis of the spindle 14. The brush 12g is pressed against the headlamp by the plate spring 30 in the embodiment shown in FIGS. 3 and 4. Instead of the plate spring 30, other spring materials such as steel wire, rubber or plastics can be used. Moreover, it will be apparent to a person skilled in the art that the screw-threaded portion 14b, recess 12f and nut 28 can be replaced with other suitable components performing the same functions.

In FIGS. 5 to 7 there is shown another embodiment of the present invention. This embodiment is substantially similar to the embodiment described with reference to FIGS. 2 to 4, and the same reference numerals are used to designate the like parts in FIGS. 5 to 7. However, the embodiment shown herein is different from that described with reference to FIGS. 2 to 4 in that another wiper arm 12' is provided which is fixed to, but angularly spaced apart from the wiper arm 12 by predetermined angle, preferably 90° in order to simultaneously wipe two adjacent headlamps of a four, headlamp system of a vehicle as the spindle 14 rotates through 90°.

What is claimed is:

1. In a headlamp wiper, assembly,
   a wiper arm having an integral block said block having a cavity extending therethrough paralleled to an axis about which said wiper arm is movable, the cavity being reduced in diameter near the top of said block and thus forming therein a shoulder, said block having two grooves formed in inner wall of said cavity, said grooves extending and being spaced opposite to each other about the vertical axis of said cavity from the bottom of said block to portions adjacent to but downwardly spaced from said shoulders;
   a hinge plate having an opening formed therethrough and projections extending outwardly therefrom in opposite directions, said hinge plate being fitable in said cavity with its projections engaging in said grooves so that said hinge plate can move until it abuts on said shoulder;
   a spindle being fit in the opening of said hinge plate so that upon rotation of the spindle the wiper arm will be rotated by said hinge plate in the same direction;
   a plate spring strip bridging over the opening in the top of said block, at which said reduced bore portion terminates, said plate spring engaging the wiper arm; and
   means for fastening said plate spring strip to said top of said spindle such that said plate spring urges said wiper arm to effect a blade bias force.

* * * * *